Patented Jan. 28, 1930

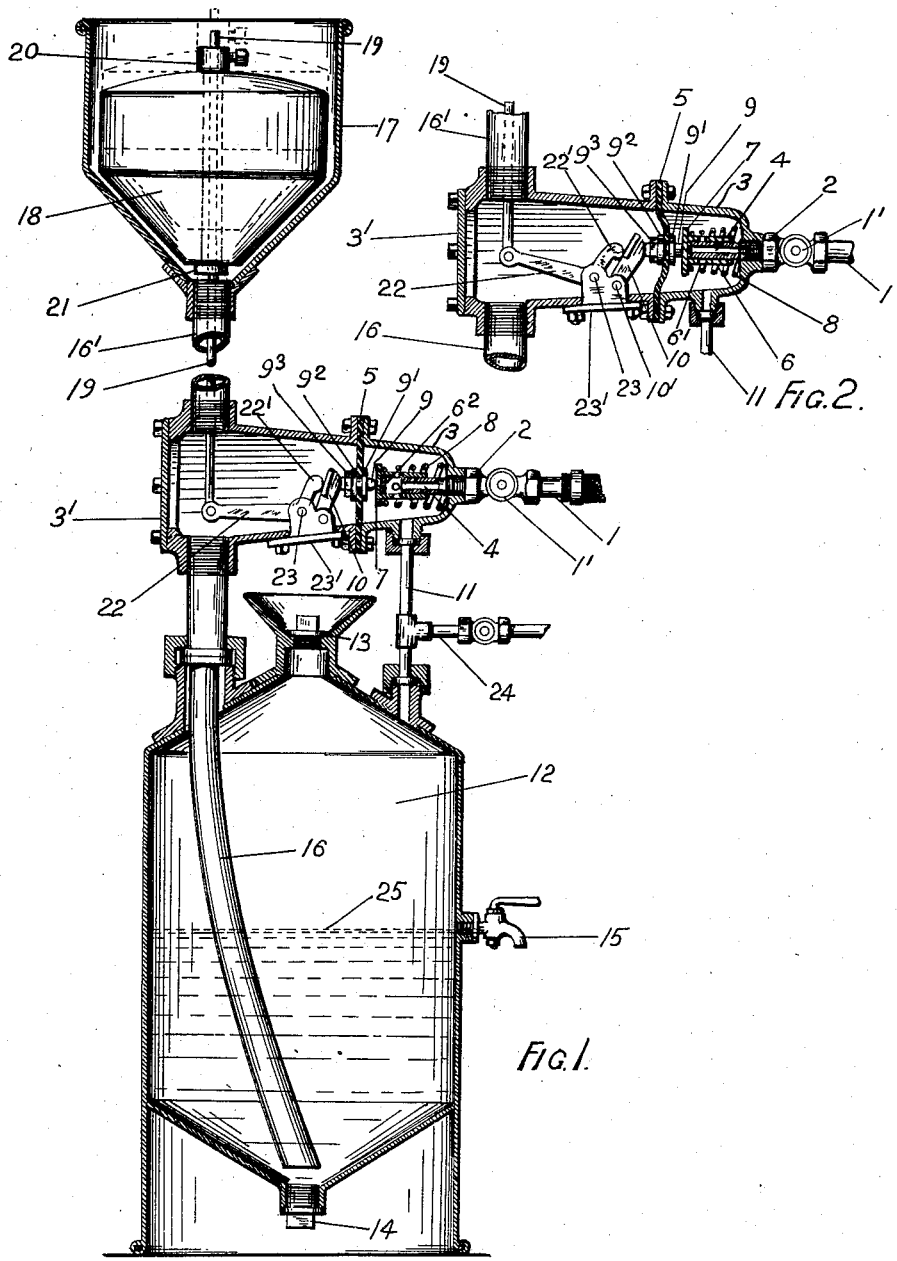

1,744,813

UNITED STATES PATENT OFFICE

VINCENT JULES BERNARD SPIES, OF MUDGEE, AUSTRALIA

REDUCED-GAS-PRESSURE REGULATOR

Application filed September 10, 1928, Serial No. 305,102, and in Australia January 12, 1928.

This invention relates to the utilization of gaseous fluid for various purposes and particularly to operations wherein or wherefor the gas to be used is stored at high pressure in suitable containers and is utilized at reduced pressure. As examples only of such utilization of gas pressure I cite (a) the raising of liquids from closed containers by admission of gas pressure, and (b) oxy-acetylene welding. Numerous other examples may be cited.

The principal object of the invention is to automatically maintain a predetermined and constant reduced pressure of gas in a vessel hereinafter referred to as a service tank from which the gas is taken as required for the purpose to which it is to be put.

Another object of the invention is to provide apparatus in which any undue gas pressure occurring from any untoward circumstance in any vessel or apparatus to which the reduced gas pressure is applied or is subject, is communicated to the service tank for subsequent use, and should this pressure become excessive, it is automatically released and the risk of bursting of pipes or vessels thus eliminated. For example, if the reduced gas pressure is applied to a barrel of liquid for the purpose before stated and if through fermentation or disturbance of the liquid, or other cause excessive pressure develops in the barrel, this excess pressure passes back to the service tank.

A further object of the invention is to provide apparatus in which should the pressure in the service tank unduly increase as the result of leakage from the high pressure container, back pressure or other cause, such excess pressure is automatically released.

The invention consists in apparatus wherein gas pressure from the high pressure container admitted to the service tank through a controlled pressure-regulating valve, operates to support a column of liquid (conveniently water) in a stand pipe coupled to or communicating with the bottom of the service tank, said column of liquid controlling the regulating valve in such manner that should the height of the column increase as the result of increase of gas pressure above normal in the service tank, the passage through the regulating valve is more or less restricted, while should the height of the column decrease as the result of reduced pressure the regulating valve is further opened. Thus a balance is established and a constant pressure automatically obtained in the service tank under ordinary conditions.

A practical embodiment of the invention is depicted in the accompanying drawings to which reference will now be made and in which Fig. 1 is a sectional elevation of the apparatus with regulating valve open, but not including the high pressure gas container or the vessel, device or appliance to which the reduced gas pressure is applied; and Fig. 2 is a sectional elevation showing the reducing valve and its associated operative parts, the valve being closed.

A gas pressure supply pipe 1 adapted at one end for connection to a high pressure gas container (not shown) is at its other end connected to the regulating-valve 2. This valve is mounted on one end of a chamber 3 and its nozzle 4 which has parallel sides projects into the latter. In this chamber is a flexible fluid-tight diaphragm 5 dividing it into two parts, and a removable plate $3^1$ is provided at the end of the chamber to afford access for assembling and other purposes. A thimble valve 6 provided with outlet holes $6^1$ is a neat sliding fit upon the nozzle 4, and has at one end a flange 7 between which and the end of chamber 3 is a light coil compression spring 8 arranged about the thimble and urging it towards the daphragm 5 and against a stud 9 which passes through a central aperture in the diaphragm. The diaphragm material immediately surrounding the aperture is gripped between the collar $9^1$ on the stud 9 and a washer $9^2$ backed by a lock nut $9^3$. The spring 8 also urges the thimble valve with its contained washer $6^2$ away from the end of the nozzle 4 of the regulating valve.

That part of chamber 3 into which the valve-nozzle 4 projects is connected by a pipe 11 with the service tank 12. This service tank is fitted with a filling plug 13, drain plug 14, and a tap 15. Entering the top of the service tank and extending downwardly therein to near its bottom, is a stand pipe 16, the upper end of which is connected to the chamber 3 on that side of diaphragm 5 remote from the valve nozzle 4.

A vertical continuation $16^1$ of the stand pipe 16 is surmounted by a float chamber 17 in which is a float 18. This float is mounted on a rod 19 and is held in place thereon between an adjustable collar 20 and a fixed collar 21. The rod 19 extends downwardly through the pipe $16^1$ and enters the chamber 3, its lower end being coupled to a bell-crank lever 22 pivoted at 23 to a block $23^1$ fitted in and bolted to the base of the chamber 3, the lever being so constructed and arranged that its shorter arm $22^1$ will, under circumstances hereinafter explained, contact with a rocker lever 10 pivoted to the block $23^1$ at $10^1$ and interposed between the arm $22^1$ and the stud 9.

From the pipe 11 there is a valved branch 24 which constitutes the service pipe whereby gas at reduced pressure from the service tank 12 is conveyed to the barrel, tank or other device or appliance (not shown) wherein or whereby it is utilized.

The service tank 12 contains a quantity of fluid 25 (conveniently water) which must be greater than is required to fill the stand pipe 16, chamber 3 on the side of the diaphragm remote from the valve 2, the extension pipe $16^1$ and the float chamber 17 to the height required to raise the float sufficiently for the purpose hereinafter explained. The tap 15 is so positioned that it serves as a gauge tap whereby should the quantity of water in the service tank be less than the minimum requirement, this fact is ascertainable by opening the tap while no gas pressure exists in the service tank, as under these circumstances no water will flow from it. Should excess water be introduced to the tank when filling it, the excess only may be drained off through tap 15, thus ensuring that the minimum quantity required remains.

The operation of the apparatus is as follows:—

Pipe 1 being coupled to a high pressure gas container, the valve $1^1$ is opened and gas passes through the valve 2 and the nozzle 4, passing out of the thimble 6 by way of the ports $6^1$ into chamber 3, and through pipe 11 into service tank 12. The effect of the increasing gas pressure in service tank is to gradually force the water up the stand pipe 16, and, if the gas pressure is sufficient, into the float chamber 17 to raise the float and the rod 19. The raising of rod 19 causes the shorter arm $22^1$ of the bell crank lever to bear upon the rocking lever 10 so that the latter presses on one end of stud 9 and the diaphragm 5 is deflected towards the valve nozzle 4. This movement of the diaphragm causes the thimble valve to slide on the nozzle 4 against the pressure of spring 8, and the washer $6^2$ to approach the end of the nozzle 4 and under certain circumstances, to ultimately seat thereon (as shown in Fig. 2) thus stopping further entry of gas into the service chamber. Whether this closing of the regulating valve is complete or partial depends obviously on the extent to which the float 18 is raised by the water, and this in turn depends on the gas pressure in chamber 12.

As gas at reduced pressure is drawn or permitted to flow through pipe 24 from tank 12, the further reduction of pressure results in a decrease of the head of water, descent of the float and consequent re-opening or further opening of the regulating valve to restore the pressure, the spring 8 forcing the thimble valve 6 off its seat on the end of the nozzle 4. This action is practically simultaneous with the reduction of pressure and is consequent thereon, so that a balance is established and a practically constant pressure maintained in the service tank, such pressure being determined by the position of the float consequent on the head of water, as will be well understood.

The apparatus as described is inherently safe against accumulation of excess pressure in the service tank as the result of leakage through the regulating valve or back pressure from any cause in pipe 24, as such excess pressure will force sufficient water up stand pipe 16 to expose the lower end of the latter and permit the gas to escape up the pipe and out through the open top of the float chamber 17. The maximum pressure obtainable in the service tank is determined by the possible head of water obtainable in the stand pipe and float chamber.

It will be observed that the gas pressure on one side of diaphragm 5 is opposed by water pressure acting on the other side; therefore the force required to be exerted by the float to move the diaphragm and thimble valve 6 towards the nozzle 4, is only that required to overcome the tension of spring 8 and the excess gas pressure, if any. The relative pressures of water and gas on opposite sides of the diaphragm depend on the positioning of the parts.

I have hereinbefore referred to water as the employed liquid, but any other suitable liquid may be substituted, due allowance being made for any variation in specific gravity.

The reducing valve with associated parts as described is of a construction and arrangement which I have found effective but I do not confine myself to this nor to the details of construction or arrangement of any of the apparatus described, as any or all of these may be varied without departing from the scope of my invention as defined by the appended claims.

What I claim and desire to secure by Letters Patent is:—

1. Apparatus for maintaining a constant reduced pressure of gas from a container of gas at a higher pressure, comprising, in combination, a closed chamber divided into two parts by a transverse flexible diaphragm, a regulating valve fitted in one end of said chamber and having its closure spring-pressed towards said diaphragm, a service tank in communication with that part of said chamber in which the valve is fitted, and also is communication, at its top, with a service pipe, a stand pipe connected to the bottom of said tank, and to the other part of said chamber, a float chamber at the top of said stand pipe, a float in said float chamber, and mechanical means coupled to said float and operating on said diaphragm to control the regulating valve as the float rises and falls on a column of liquid maintained in said stand pipe and float chamber by the gas pressure in the service tank.

2. Apparatus for maintaining a constant reduced pressure of gas from a container of gas at a higher pressure, including in combination, a chamber formed in two parts separated by a transverse flexible diaphragm, fitted with a central stud, a gas regulating valve fitted in one end of said chamber and comprising a tubular nozzle on which is a ported slidable thimble-closure spring-pressed towards said diaphragm, said closure having a washer to seat on the end of said nozzle, a service tank containing a quantity of liquid and in communication with that part of said chamber in which said valve is fitted, a service pipe coupled to the upper portion of said tank, a stand pipe in communication at one end with the bottom of said tank and at its other end with that part of said chamber separated from the regulating valve, an extension of the stand pipe connected at its lower end to the same part of said chamber, a float in a chamber mounted on the upper end of said extension of the stand pipe, a rod connected to said float and extending downwardly through said extension of the stand pipe into the first mentioned chamber, a bell-crank lever pivotally mounted in the latter and having its longer arm coupled to said rod, said lever being so arranged that upward movement of said float causes the shorter arm of the lever to press the diaphragm towards the regulating valve and move the thimble closure of the valve in a direction to close the latter, while downward movement of said float retracts the shorter arm from the diaphragm to permit the thimble closure to be moved by its spring in a direction to open the valve, the position of said float being controlled by the level of liquid in the float chamber as determined by the gas pressure in the service tank, such pressure being itself regulated by the height of the column of liquid.

Signed at Sydney this ninth day of August, A. D. 1928.

VINCENT JULES BERNARD SPIES.